United States Patent Office 3,467,610
Patented Sept. 16, 1969

3,467,610
AQUEOUS FLOOR POLISH COMPOSITIONS CONTAINING A WATER-INSOLUBLE ADDITION POLYMER AND A POLYVALENT METAL CHELATE
Irwin S. Fiarman, Willingboro, N.J., and David R. Gehman, Harleysville, Pa., assignors to Rohm and Haas Company, Philadelphia, Pa., a corporation of Delaware
No Drawing. Filed Nov. 29, 1967, Ser. No. 686,689
Int. Cl. C09g 1/04, 1/10, 1/16
U.S. Cl. 260—22
10 Claims

ABSTRACT OF THE DISCLOSURE

This invention relates to coating compositions, especially floor polishing compositions, containing a water-insoluble addition polymer, a polyvalent metal chelate and, as optional components, a wax and an alkali-soluble resin wherein the polyvalent metal chelate is derived from a polyvalent metal ion and a bidentate amino acid ligand.

DETAILED DESCRIPTION OF THE INVENTION

This invention relates to a composition containing dispersions useful as coating compositions, especially floor polishing compositions, for the production of high gloss finishes on such solid substrates as wood, linoleum, asphalt tile, rubber, glass and vinyl tile, either with or without paint or varnish finishes. The coating formulations of this invention are especially useful for application to various types of flooring to form clear coatings having a glossy appearance.

It is known to employ, as a floor polish, a composition containing an aqueous polymeric dispersion of a water-insoluble emulsion copolymer, a wax, an alkali-soluble resin, a dispersing agent, and a polyvalent metal compound. Such compositions are disclosed in U.S. Patent 3,328,325 to Zdanowski. These compositions were a substantial advance in the art in that the redispersion of previously applied polishes by a newly applied polish during application of the latter was retarded. However certain of these compositions, when applied to surfaces and dried, resulted in slightly reduced gloss that was apparently caused by the presence of the polyvalent metal compound.

It is an object of the present invention to obtain a polyvalent metal complex containing polish composition having a particularly advantageous balance of properties which include exceptionally high gloss coupled with detergent resistance, recoatability, and good removability properties.

It is a further object of this invention to obtain a metal complex containing polish formulation wherein the metal complex does not cause any gloss reduction in the coated substrate. Even though the floor polishes of this invention are removable with conventional ammoniated cleaners, the polish compositions are resistant to attack by standard household detergents.

The polishing compositions of the present invention can generally be defined in terms of the following proportions of the main constituents.

| Constituent: | | Proportion |
|---|---|---|
| (A) Water-insoluble addition polymer | parts by weight | 10–100 |
| (B) Wax | do | 0–90 |
| (C) Alkali-soluble resin | do | 0–50 |
| (D) Wetting, emulsifying and dispersing agents | percent | [1] 0.5–20 |
| (E) Polyvalent metal compound | do | [2] 1–50 |
| (F) Water to make total solids of 8% to 45%. | | |

[1] On weight of A+B+C.
[2] On weight of A.

The total of A, B and C should be 100. The amount of C, when present, may be from 1% to 50% of the weight of the copolymer of A, and preferably from about 5% to 25% of the weight of the copolymer of A.

For a nonbuffable, self-polishing composition, the wax should not be over 35 parts by weight, preferably 0 to 25 parts by weight in 100 parts total of polymer plus wax according to the above table. Satisfactory non-buffable floor polish formulations have been prepared without the inclusion of a wax. Thus wax is not an essential component of a self-polishing composition. For a buffable polish composition, the wax should be at least 35 parts by weight on such total. Examples of wetting and dispersing agents include alkali metal and amine salts of higher fatty acids having 12 to 18 carbon atoms, such as sodium, potassium, ammonium, or morpholine oleate or ricinoleate, as well as the common nonionic surface active agents. Additional wetting agent improves the spreading action of the polish.

For polishing floors, the coating obtained from the composition should have a Knoop hardness number of 0.5 to 15 when measured on a film thereof 0.5–2.5 mils thick on glass. This range of hardness provides good resistance to abrasion and wear and can be obtained by the appropriate selection of monomers to be polymerized.

The polyvalent metal complex employed in the floor polish formulation of this invention contains a polyvalent metal moiety, an organic bidentate amino acid ligand moiety and generally, if the chelate is added to the formulation in solubilized form, an alkaline moiety. The polyvalent metal ions may be those of beryllium, cadmium, copper, calcium, magnesium, zinc, zirconium, barium, strontium, aluminum, bismuth, antimony, lead, cobalt, iron, nickel or any other polyvalent metal which can be added to the composition by means of an oxide, hydroxide, or basic, acidic, or neutral salt which has appreciable solubility in water, such as at least about 1% by weight therein. The alkaline moiety may be provided by ammonia or an amine. The amino acid bidentate ligand is preferably an aliphatic amino acid, but may also be a heterocyclic amino acid.

The amino acid bidentate ligands may be represented by the formula

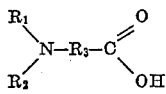

wherein $R_1$ and $R_2$ are independently selected from hydrogen, alkyl, phenyl and benzyl, $R_3$ represents a straight chain or branched chain alkylene, alkylidine or aralkylidene radical having 1 to 12 carbon atoms, preferably 1 to 6 carbon atoms, with the proviso that at least 1, but less than 4 carbon atoms, are in a straight chain joining the nitrogen atom and the carbonyl carbon atom, and $R_1$ and $R_3$ may form a 5 or 6 membered heterocyclic ring with the nitrogen atom to which they are joined with the proviso that $R_2$ is hydrogen.

Although $R_1$ and $R_2$ are preferably hydrogen, suitable $R_1$ and $R_2$ alkyl radicals contain 1 to 6 carbon atoms such as methyl, ethyl, propyl, isopropyl and butyl. $R_3$ is preferably methylene, but may be ethylene, propylene, ethylidene, n-propylidine, isopropylidene, butylidene and phenylethylidene.

Representative bidentate amino acid ligands include glycine (aminoacetic acid), alanine ($\alpha$-aminopropionic acid), $\beta$-alanine ($\beta$-aminopropionic acid), valine ($\alpha$-isopropylaminoacetic acid), norvailine ($\alpha$-n-propylaminoacetic acid), $\alpha$-aminobutyric acid, leucine (2-amino-4-methyl pentanoic acid), norleucine (2-aminohexanoic acid), N-methylaminoacetic acid, N-ethylaminoacetic acid, dimethylaminoacetic acid, diethylaminoacetic acid, N-n-propylaminoacetic acid, N-isopropylaminoacetic acid, N-butylaminoacetic acid, phenylalanine, N-phenylaminoacetic acid, N-benzylaminoacetic acid, proline, nicotinic acid and tetrahydronicotinic acid.

Preferred polyvalent metal complexes include cadmium glycinate, nickel glycinate, zinc glycinate, zirconium glycinate, cobalt alaninate, copper alaninate, zinc alaninate, copper $\beta$-alaninate, zinc $\beta$-alaninate, nickel norvalinate, zinc valinate and copper dimethylaminoacetate.

The polyvalent metal complex or coordinate compounds are initially readily soluble in the aqueous medium of the polish composition, especially at a pH of 6.5 to 10.5 and have the advantage of drying to form a polish deposit which is essentially insoluble in water but still removable. The polyvalent metal complex may also be added to the water-insoluble emulsion copolymer in solubilized form. This is accomplished by solubilizing the metal complex in an alkaline solution such as dilute aqueous ammonia. Since the ammonia may complex with the polyvalent metal coordinate compound, a compound such as cadmium glycinate, when solubilized in an aqueous ammonia solution, may be named cadmium ammonium glycinate. Other polyvalent metal complexes described in this invention may be similarly named.

The polyvalent metal complexes must be stable in an alkaline solution; however, a complex that is to stable is undesirable since dissociation of the metal ions would be retarded during film formation of the coating.

The amount of the polyvalent metal compound added may be from about 1% to 50% and is preferably about 2 to 20% by weight, based on the weight of the water-insoluble addition polymer in the composition.

The water-insoluble polymer obtainable by emulsion polymerization employed in the compositions of the present invention must provide a hardness such that the composition containing it deposits a film having a Knoop hardness number (KHN) of at least 0.5 and preferably from about 1.2 to 15, though for many purposes the KHN of the coating film deposited may be as high as 16 or greater, when measured on a film of 0.5 to 2.5 mil thickness on a glass panel. The emulsion copolymer should also have a minimum film forming temperature (MFT) of less than about 85° C. and preferably less than about 80° C.

The water-insoluble polymer may be obtained by emulsion polymerization of one or more monoethylenically unsaturated monomers including acrylic esters of acrylic or methacrylic acid wherein the alcohol moiety of the ester is derived from benzyl alcohol, phenol, or a saturated monohydric aliphatic alcohol, especially an alkanol having 1 to 8 carbon atoms, such as cyclopentanol, cyclohexanol, methanol, ethanol, n-propanol, isopropanol, n-butanol, isobutanol, sec-butanol, tert-butanol, any of the pentanols, hexanols, octanols, decanols, dodecanols, hexadecanols, and octadecanols. Preferred polymers are copolymers containing at least one of these esters of acrylic acid with one or more monomers selected from the group consisting of ($C_1$–$C_4$)-alkyl methacrylates, acrylonitrile, methacrylonitrile, vinyl acetate, styrene, vinyltoluene (o, m, or p), vinyl chloride or vinylidene chloride. In place of part or all of the acrylic acid ester component, the preferred type of polymer may contain a ($C_5$–$C_{18}$)-alkyl methacrylate. Blends of these copolymers may be used. The polymers may also be graft copolymers including grafts of the monomers mentioned on shellac.

The polymers may contain from 1 to 18% of an $\alpha,\beta$-monoethylenically unsaturated acid, such as maleic, fumaric, aconitic, crotonic, acrylic, methacrylic, or itaconic acid, the latter three being preferred, for the purpose of making the coatings deposited therefrom readily removable by the application of alkaline media, such as dilute aqueous ammonia. If desired, the polymer may contain minor amounts, generaly less than about 10%, and preferably from about 1% to 6%, of polymerized units of at least one monomer containing amine groups to render the coatings deposited readily removable by the application of acid media, such as dilute aqueous acetic acid solutions. Examples of amine-containing monomers are: any of the vinylpyridines, or any compound of the formula

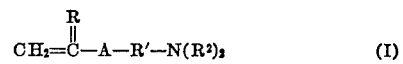

wherein R is selected from the group consisting of H, Cl, and $CH_3$.

$R^2$ is selected from the group consisting of H and saturated hydrocarbon groups having from 1 to 10 carbon atoms such as methyl, ethyl, butyl, 2-ethylhexyl, cyclohexyl, and t-octyl, A is selected from the group consisting of —O—, S,

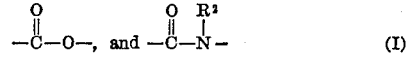

and

R' is a straight or branched chain alkylene group having from 2 to 10 carbon atoms. Members $R^2$ may be identical or different groups in their several occurrences in any particular compound.

Examples of monomers of Formula I are:

N-(3-dimethylamino)propyl methacrylate;
t-Butylaminoethyl methacrylate;
Dimethylaminoethyl methacrylate;
N-($\beta$-dimethylaminoethyl)acrylamide;
N-($\beta$-dimethylaminoethyl)methacrylamide;
10-aminodecyl vinyl ether;
10-aminodecyl vinyl sulfide;
8-aminooctyl vinyl ether;
Diethylaminohexyl methacrylate;
Diethylaminoethyl vinyl ether;
Diethylaminoethyl vinyl sulfide;
5-aminopentyl vinyl ether;
3-aminopropyl vinyl ether;
2-aminoethyl vinyl ether;
2-aminoethyl vinyl sulfide;

2-aminobutyl vinyl ether;
4-aminobutyl vinyl ether;
Dimethylaminoethyl methacrylate;
Dimethylaminoethyl vinyl ether;
Dimethylaminoethyl vinyl sulfide;
N-(3,5,5-trimethylhexyl)aminoethyl vinyl ether;
N-cyclohexylaminoethyl vinyl ether;
β-(t-Butylamino)ethyl acrylate;
2-(1,1,3,3-tetramethylbutylamino)ethyl methacrylate;
N-t-butylaminoethyl vinyl ether;
N-methylaminoethyl vinyl ether;
N-2-ethylhexylaminoethyl vinyl ether;
N-t-octylaminoethyl vinyl ether.

Additionally amines include

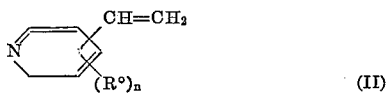

(II)

wherein $R°$ is H or alkyl of 1 to 12 carbon atoms and $n$ is an integer having a value of 1 to 4. Examples include 2-vinylpyridine;
3-vinylpyridine;
4-vinylpyridine;
2-methyl-5-vinylpyridine;
5-methyl-2-vinylpyridine;
4-methyl-2-vinylpyridine;
2-ethyl-5-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-5-vinylpyridine;
2-methyl-5-undecyl-3-vinylpyridine;
3-dodecyl-4-vinylpyridine;
2,4-dimethyl-5,6-dipentyl-3-vinylpyridine;
2-decyl-5-(α-methylvinyl)-pyridine.

Further examples of monoethylenically unsaturated monomers that may be copolymerized to form the water-insoluble addition polymers are partial esters of unsaturated aliphatic dicarboxylic acids and particularly the alkyl half esters of such acids. Examples of such partial esters are alkyl half esters of itaconic acid, fumaric acid and maleic acid wherein the alkyl group contains 1 to 6 carbon atoms. Representative members of this group of compounds include methyl acid itaconate, butyl acid itaconate, methyl acid fumarate, butyl acid fumarate and methyl acid maleate.

In the compositions of the present invention, the relative proportions of the polymer to wax are from 100:0 to 10:90 by weight and preferably are about 40:60 to 95:5.

The variation in these relative proportions provides for various buffing characteristics. The amount of an emulsifying or dispersing agent or agents is generally from 0.1 to 30%, and preferably 1 to 25%, of the combined weights of the copolymer and wax. The concentration of the aqueous dispersion may be from 8 to 45% solids and is preferably about 10 to 20% by weight of solids. The dispersion should have a pH of at least about 3.0 and it may be as high as 11.0 or more. Most advantageously, its pH is from about 7 to about 10 as the use of lower pH values requires the use of non-ionic emulsifier for the wax and generally excludes the inclusion of any substantial amount of constituent C of the preceding table. Most available wax emulsions are based on alkaline dispersants so that a pH of 7 to 10 is normally most convenient. However, for special purposes, the pH may be in the range of 3 to 6.5. Thus, in the case of vinyl acetate copolymers, a pH in this range minimizes hydrolysis of the vinyl ester units. Suitable alkaline or buffering agents, such as borax, sodium hydroxide, ammonia, or amines, may be introduced to adjust the pH of the desired value.

The copolymer is preferably made by the emulsion copolymerization of the several monomers in the proper proportions. Conventional emulsion polymerization techniques are described in United States patents 2,754,280 and 2,795,564. Thus the monomers may be emulsified with an anionic, a cationic, or a nonionic dispersing agent, about 0.5% to 10% thereof being used on the weight of total monomers. The acid or amine monomers, if used, is of course, soluble in water so that the dispersing agent serves to emulsify the other monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of ½ to 2% each based on the weight of monomers to be copolymerized. The temperature may be from room temperature to 60° C. or more as is conventional.

Suitable anionic dispersing agents include the sodium salts of the higher fatty acid sulfates, such as that of lauryl alcohol, the higher fatty acid salts, such as the oleates or stearates or morpholine, 2-pyrrolidone, triethanolamine or mixed ethanolamines, or any of the nonionic types, such as ethylene oxide-modified alkyl phenols, of which tert-octyl phenol modified by 20 to 40 ethylene oxide units is representative, ethylene oxide-modified higher fatty alcohols, such as lauryl alcohol, containing 20 to 50 ethylene oxide units, similarly modified long-chain mercaptans, fatty acids, amines, or the like.

If the polymer is initially prepared by emulsion polymerization using an anionic emulsifier exclusively, it may be desirable to add a nonionic emulsifier to the polymer dispersion before adding the compound providing the polyvalent metal cations. The amount of the nonionic emulsifier needed depends on the amount of anionic emulsifier present and the amount of polyvalent metal compound to be added. Generally, about 0.1 to 10% or more of the nonionic surfactant is adequate.

If the wax (when used) is separately dispersed, the dispersing agents mentioned above may similarly be used, but amine salts of soap, such as an ethanolamine oleate or stearate, are also quite useful. Suitable homogenizing mills may be used for assisting the dispersion.

The waxes or mixtures of waxes which may be used include waxes of a vegetable, animal, synthetic, and/or mineral origin, or mixtures thereof, such as carnauba, candelilla, Fischer-Tropsch wax, microcrystalline wax, lanolin, cocoa butter, cottonseed, stearin, Japan wax, bayberry, myrtle, mace, palm kernel, beewax, spermaceti, Chinese insect, mutton tallow, oxidized polyethylene wax, polyethylene emulsions, polypropylene, copolymers of ethylene and acrylic esters and acids, waxes obtained by the hydrogenation of cocoanut oil or soybean oils, and the mineral waxes such as paraffin, ceresin, montan, ozokerite, etc.

The compositions are adapted to form clear glossy coatings. However, if desired, a translucent appearance or an opaque or colored appearance may be obtained by the introduction of dulling agents, water-soluble or oil-soluble dyes, pigments or fillers in suitable proportions. Examples of suitable water-insoluble pigments which may be used include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth.

The amount of pigment may be varied widely, depending on the effect desired. The amount of pigment, by weight based on the weight of the organic film-forming material, may vary between about 2% for light, high-hiding pigments such as carbon black and about 100% for heavy, low-hiding pigments such as lead chromate.

The aqueous dispersions may contain up to about 75% by weight of the total weight of A, B and C of a plasticizer whenever it is necessary in a particular application, to provide a lower temperature of film formation from the emulsion polymer dispersions. From 5 to 35% by weight of the plasticizer, based on the weight of copolymer, is quite practical.

Since the purpose of the plasticizer is usually to facilitate film formation, and since it is not always necessary to impart flexibility to the copolymer composition when it is inherently tough and flexible, as is often the case, a fugitive or semifugitive plasticizer may sometimes be preferred rather than a permanent plasticizer. However, permanent plasticizers may be used without the production of films having poor wear-resistance and poor resistance to water since the proportion of plasticizer introduced is in most cases relatively small, generally being not over about 30% by weight of the copolymer solids. Certain plasticizers, such as tributoxyethyl phosphate, serve also as leveling agents. Mixtures of fugitive and permanent plasticizers may also be used. Certain fluorocarbon surfactants also act as leveling agents and these materials are described in U.S. Patent 2,937,098.

Examples of fugitive plasticizers include the monoethyl of monomethyl ether of diethylene glycol, isophorone, benzyl, alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, butyl cyclohexyl phthalate, mixed benzoic acid and fatty oil acid esters of pentaerythritol, poly(propylene adipate) dibenzoate diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl)phthalate, tributoxyethyl phosphate, tributyl phosphate. The particular plasticizer and the amount thereof used are chosen in accordance with the demand for compatibility and efficiency in lowering the film-forming temperature.

Besides containing the copolymer, the metal complex, and a suitable dispersing or emulsifying agent and the optional wax, pigments and fillers mentioned hereinabove, the composition of the present invention may also contain other ingredients such as wax-soluble resins or gums or alkali-soluble resins in an amount of 0% to 50% of the weight of the copolymer. Examples of the wax-soluble materials include terpene-phenolic resins, heat process ("run") Congo, wood rosin, and so on. Generally the alkali-soluble resins have acid numbers varying from about 100 to 300 and average number molecular weights ranging from about 200 to about 10,000 and preferably about 800 to 5000.

Examples of alkali-soluble resins include shellac, Manila gum, loba gum, copolymers of styrene or vinyltoluene with at least one $\alpha$-$\beta$ monoethylenically unsaturated acid or anhydride such as styrene-acrylic acid resins or styrene-maleic anhydride resins, and alkali-soluble alkyds, which are essentially polyesters of aliphatic dicarboxylic acids with aliphatic polyhydric alcohols which may be modified with $C_8$-$C_{18}$ fatty acids, glycerol esters of $C_8$-$C_{18}$ fatty acids, and resin acids, such as abietic or rosin. The resins disclosed in U.S. Patent 2,063,542 bay be used. Examples of the dicarboxcyclic acids include maleic, fumaric, adipic, sebacic, including anhydrides thereof. The polyhydric alcohols may be glycerol, pentaerythritol, trimethylolethane, and glycols having 2 to 8 carbon atoms including diethylene glycol and triethylene glycol.

Other alkali-soluble resins include rosin-maleic anhydride adducts modified with polyols and rosin-fumaric acid adducts modified with polyols. Representative polyols are ethylene glycol, glycerol, propylene glycol, pentaerythritol and mixtures thereof. The alkali-soluble resin is generally added to the polish formulation as a resin cut which is an aqueous alkaline solution obtained by solubilizing the alkali-soluble resin with an alkaline substance such as ammonium hydroxide.

The concentration of the aqueous dispersion for application purposes may desirably be from 8 to 45% solids and is preferably from about 10 to 20% by weight of solids.

The compositions may be used for impregnating textiles, leather, paper, or other porous or fibrous materials. They may also be applied to plastic sheets such as cellophane, polyethylene, polyethylene glycol terephthalate, Saran and the like. They may also be applied to rigid surfaces, including all sorts of metals such as steel, aluminum, copper, brass, bronze, tin, chromium, and wrought iron, and to wood, stone, masonry, brick, glass, asbestos cement shingles or siding, terrazzo, cement and concrete surfaces such as floors, and so on. The compounds are especially valuable for polishing floors, such as those made of wood, linoleum, rubber, and all sorts of plastic tiles, such as linoleum, asphalt, vinyl, and vinyl-asbestos.

Examples of wetting and dispersing agents include alkali metal and amine salts of higher fatty acids having 12 to 18 carbon atoms, such as sodium, potassium, ammonium or morpholine oleate or recinoleate, as well as the common nonionic surface active agents. Additional wetting agent improves the spreading action of the polish.

For polishing floors, the coating obtained from the composition should have a Knoop hardness number of 0.5 to 15 when measured on a film thereof 0.5–2.5 mils thick on glass. This range of hardness provides good resistance to abrasion and wear and can be obtained by the appropriate selection of monomers to be polymerized.

The copolymer and wax (and resin when used) may be mixed in any order desired. For example, the wax or resin or both may be introduced into the aqueous polymer dispersion by adding a dispersion of the wax or resin or both to the copolymer dispersion or vice-versa. Preferably, the copolymer is added to a dispersion of the wax and then the resin is mixed in. The wax dispersion may be prepared using any of the anionic or non-ionic dispersing agents mentioned above for use in copolymerization. However, amine salts of soap such as ethanolamine or morpholine oleate or stearate, are quite useful. Besides incorporating wax in floor polishing compositions, an additional plasticizer or a fugitive fluxing aid may be used to read the desired minimum film-forming temperature of the composition.

The polyvalent metal complex may be incorporated into the composition at any stage of the formulation; generally it is convenient to add the polyvalent metal complex to the water-insoluble addition polymer.

The compositions have good storage stability under normal conditions of temperature. They may be applied in the usual manner by means of wiping cloths, by brushing, or by means of mops. They dry rapidly to clear or opaque films, if pigmented, having hard and tough glossy surfaces. There is generally no discoloration of the films on ageing. The application of the compositions to surfaces carrying previously applied coatings of alkali-removable compositions does not remove appreciable amounts of such coating nor is the viscosity or consistency of the composition of the present invention detrimentally affected. Hence, the compositions go on the surface uniformly and with ease but without streakiness or other irregularities.

The compositions containing copolymers having carboxylate (acid or salt) groups are removable by certain ammoniated cleaners such as ammonium hydroxide and tetramethylammonium hydroxide as explained in more detail hereinafter. Amines such as monoethanolamine may also serve as stripping agents. The following examples in which the parts and percentages are by weight unless otherwise indicated are illustrative of the invention.

Example 1

(a) An emulsion copolymer was prepared with the following weight percent composition employing 2% sodium lauryl sulfate (based on total weight of the monomers) as the emulsifier and a conventional emulsion polymerization technique:

| | Percent |
|---|---|
| Methyl methacrylate | 55 |
| Butyl acrylate | 38 |
| Methacrylic acid | 7 |

The final polymer solids of the emulsion was 40%. The emulsion was diluted with water to 15% polymer solids. The pH of the emulsion was adjusted to 6.5 using 14% $NH_4OH$.

(b) A mixture of 40 parts of emulsifiable low molecular weight polyethylene melting at about 75° C. and 8 parts of oleic acid was melted and 8 parts of morpholine was added to the mixture. The complete melt was added slowly to 184 parts of water heated to 205° F. while under vigorous agitation. The emulsion was allowed to cool and was then diluted to 15% solids.

(c) A resin cut solution containing fifteen parts of an alkali-soluble glycerol modified rosin-maleic anhydride adduct, having a molecular weight of about 1000 and an acid number of about 140, in 62.5 parts of water containing 3.75 parts of 28% $NH_4OH$ solution was prepared by heating the mixture at 50° C. The resulting solution was filtered and then diluted to 15% solids.

(d) Seventy-two and a half parts of the polymer dispersion (15% solids) in part (a) was mixed with eleven parts of wax emulsion (15% solids) from part (b) and 16.5 parts of alkyd solution (15% solids) from part (c). The resulting mixture was further modified by the addition of 0.35 part of tributoxyethyl phosphate, one and a half parts of diethylene glycol monoethyl ether, one and a half parts of ethylene glycol, 0.6 part of nonylphenol modified with an average of 10 ethylene oxide units and .004 part of a fluorinated hydrocarbon surfactant of the formula $C_8F_{17}SO_2N(C_2H_5)CH_2COOK$, hereinafter referred to as surfactant F.

(e) Fifty parts of the resultant floor polish was modified by the addition of 2.55 parts of zinc ammonium alaninate. The zinc ammonium alaninate was prepared by mixing 42 parts of alanine, 40 parts of 28% ammonium hydroxide solution, 22 parts of zinc oxide and 100 parts water until a clear homogeneous solution resulted.

(f) A homogeneous vinyl floor tile, 9" x 9" in size was divided into two equal parts. One half was coated with 1.5 mls. of the finished floor polish from (d) and the other half with 1.5 mls. of the zinc alaninate modified polish from (e). After a sixty minute drying period at 25° C. and 50% relative humidity (R.H.) the tile halves were recoated with 1.5 mls. of the respective formulations. The following observations were made:

(1) The tile coated with the floor polish containing zinc alaninate displayed equal one coat gloss compared to the control polish (d) containing no metal complex, (2) The zinc alaninate containing polish displayed excellent recoatability performance while the control was dull, had many rough spots and displayed poor recoatability. This was undoubtedly due to irregular partial redispersion of the first polish coat upon application of a new one, (3) The metal-containing polish displayed water resistance equivalent to the control, (4) The control exhibited no detergent resistance whereas the metal containing system displayed a high degree of detergent resistance, and (5) Both floor polishes were removed readily with a 3% water solution of ammonium hydroxide.

Test methods for the evaluation of floor polishes, including methods for evaluating water resistance, detergent resistance, gloss, removability, recoatability and film hardness are described in detail in Resin Review, volume XVI, No. 2, 1966, published by Rohm & Haas Company, Philadelphia, Pa. 19105.

Example 2

The polymer dispersion in Example 1, part (a), diluted to 15% solids, was formulated as indicated below:

| | Parts |
|---|---|
| Polymer dispersion (15% solids) | 100 |
| Tributoxyethyl phosphate | 0.8 |
| Diethylene glycol monoethyl ether | 1.5 |
| Ethylene glycol | 1.5 |
| Surfactant F | 0.6 |
| Zinc alaninate (solubilized in ammonium hydroxide) | 3.0 | pH adjusted to 8.9.

The above polish formulation was evaluated according to the precedure of Example 1(f). Excellent flow and leveling properties were observed even though the polish formulation contained neither wax nor an alkali-soluble resin.

Example 3

(a) An emulsion copolymer was prepared with the following weight percent composition employing 3% sodium lauryl sulfate (based on total weight of the monomer) as the emulsifier and a conventional emulsion polymerization technique:

| | Percent |
|---|---|
| Ethyl acrylate | 42 |
| Methyl methacrylate | 53 |
| Methacrylic acid | 5 |

The final polymer solids concentration of the emulsion was 38%. The emulsion was diluted with water to 15% polymer solids. One hundred parts of the emulsion was modified by the addition of 10 parts of zinc ammonium alaninate prepared by the method of Example 1(e).

(b) Eighty parts of the polymer dispersion in part (a) was mixed with 20 parts of an alkali-resin that is a styrene-acrylic acid copolymer resin having a molecular weight of about 2500 and an acid number of about 205. The resulting mixture was further modified by the addition of 0.9 part of tributoxyethyl phosphate, 2.0 parts of diethylene glycol monoethyl ether, 1.5 parts of 2-pyrrolidone, 0.1 part of Formalin and 0.4 part of Surfactant F. The pH of the final formulation was adjusted to 8.7 with ammonium hydroxide. The polish formulation was evaluated according to the procedure of Example 1(f) and similar results were observed.

Example 4

(a) An emulsion polymer was prepared with the following weight percent composition employing 1% sodium lauryl sulfate:

| | Percent |
|---|---|
| Butyl acrylate | 30 |
| Methyl methacrylate | 20 |
| Acrylonitrile | 20 |
| α-Methyl styrene | 20 |
| Methacrylic acid | 10 |

The final polymer solids of the emulsion was 40%.

(b) One hundred parts of the emulsion polymer dispersion from (a) was modified by the addition of 10 parts of zinc ammonium β-alaninate then diluted to 15% solids, and further modified as follows:

| | Parts |
|---|---|
| Polymer dispersion (15% solids) | 80 |
| Alkali-soluble resin (Example 1, part (c)) | 8 |
| Wax emulsion (Example 1, part (b)) | 12 |
| Tributoxyethyl phosphate | 0.75 |
| Surfactant F | 0.5 |
| Diethylene glycol monoethyl ether | 1.5 |
| Diethylene glycol | 1.5 |

Evaluation of the floor polish by the method of Example 1, part (f), gave similar results.

Example 5

An emulsion polymer was prepared with the following weight percent composition employing 1% sodium lauryl sulfate:

| | Percent |
|---|---|
| Ethyl acrylate | 27 |
| Styrene | 68 |
| Methacrylic acid | 5 |

The final polymer solids of the emulsion polymer dispersion was 40%. One hundred parts of the emulsion was modified with 3.3 parts of zinc ammonium N-methylaminoacetate, then diluted to 15% solids, and further formulated as follows:

| | Parts |
|---|---|
| Emulsion polymer (15% solids) | 72.5 |
| Alkyd resin of Example 1, part (c) | 16.5 |
| Wax Emulsion of Example 1, part (b) | 11.0 |
| Ethylene glycol monoethyl ether | 1.5 |
| Diethylene glycol | 1.5 |
| Tributoxyethyl phosphate | 0.35 |
| Surfactant F | 0.4 |
| Dibutyl phthalate | 1.0 |
| Nonylphenol modified with an average of about 40 oxyethylene groups (emulsifier) | 0.3 |

The evaluation results were equivalent to those observed for the formulation of Example 1.

Example 6

Cadmium ammonium glycinate was prepared and employed in the manner described in Example 1 in lieu of zinc ammonium alaninate. Cadmium ammonium glycinate was prepared by adding together 8.4 parts glycine, 8.0 parts of a 28% solution ammonium hydroxide, 20 parts water and 4.4 parts of cadmium oxide until a homogeneous solution appeared.

One hundred parts of the emulsion in Example 1, part (a), was diluted to 15% solids and modified with 3.2 parts of cadmium ammonium glycinate. The cadmium ammonium glycinate and zinc ammonium N-methylaminoacetate modified formulations were comparable in terms of floor polish properties.

Example 7

A copolymer dispersion was prepared as in Example 3 from a mixture of 40% ethyl acrylate, 39% methyl methacrylate, 13% styrene and 8% methacrylic acid and the solids concentration was adjusted to 15% with water. After being formulated according to Example 2, the floor polish was evaluated as in Example 1(f) and similar results were observed.

Example 8

(a) An emulsion copolymer was prepared with the following weight percent composition employing 3% (based on total weight of monomers) of octyl phenol modified with an average of 30 ethylene oxide units as the emulsifier and a conventional emulsion polymerization technique:

| | Percent |
|---|---|
| Methyl acrylate | 60 |
| Vinyltoluene | 37 |
| Acrylic acid | 3 |

(b) Emulsion polymer from (a) was substituted for the emulsion copolymer in Example 1. Similar evaluation results were obtained as in Example 1.

Example 9

A copolymer dispersion was prepared as in Example 8 from a mixture of 25% 2-ethylhexyl acrylate, 72% styrene and 3% itaconic acid. Similar results to those in Example 1 were observed when this copolymer was used in the procedure of Example 1.

Example 10

(a) An emulsion copolymer was prepared with the following weight percent monomer composition employing 4% (based on total weight of monomers) of octyl phenol modified with an average of 30 ethylene oxide units as the emulsifier and a conventional emulsion polymerization technique:

| | Percent |
|---|---|
| Butyl acrylate | 26 |
| Methyl methacrylate | 20 |
| Styrene | 30 |
| Methacrylic acid | 4 |
| Methacrylonitrile | 20 |

The final polymer solids of this emulsion was 40%. The emulsion was allowed to cool and was then diluted to 15% solids with water.

(b) One hundred parts of the emulsion polymer dispersion from (a) was further formulated as follows:

| | Parts |
|---|---|
| Polymer dispersion (15% solids) | 76 |
| Alkali soluble resin (Example 1(c)) containing 4 parts, by weight of the polymer dispersion, of zinc glycinate | 14 |
| Wax emulsion | 10 |
| Diethylene glycol | 1.5 |
| Ethylene glycol monoethyl ether | 1.5 |
| Tributoxyethyl phosphate | 0.5 |
| Surfactant F | 0.4 |

This example employed the modification of adding zinc glycinate in the form of a powder to the alkali-soluble resin cut which contained sufficient excess alkali to solubilize the zinc glycinate. The evaluation results were satisfactory.

Example 11

The emulsion polymer in Example 1 was diluted to 15% solids and five aliquot portions were modified with the following metal complexes that were first solubilized in ammonium hydroxide:

(a) Cadmium glycinate (2.8 parts)
(b) Zirconium glycinate (3.5 parts)
(c) Zinc alaninate (8.0 parts)
(d) Zirconium β-alaninate (3.0 parts)
(e) Copper dimethylaminoacetate (5.5 parts)

Each of the above modified emulsion copolymers were formulated as follows:

| | Parts |
|---|---|
| Modified polymer dispersion (15% solids) | 80 |
| Alkali-soluble resin (Example 1(c)) | 5 |
| Wax emulsion (Example 1(b)) | 15 |
| Polyvalent metal chelate | (a) to (e) |
| Ethylene glycol | 1.5 |
| Diethylene glycol monoethyl ether | 1.5 |
| Tributoxyethyl phosphate | 0.5 |
| Surfactant F | 0.4 |

The floor polish evaluation results were similar to those observed in Example 1.

Example 12

An emulsion copolymer was prepared with the following weight percent composition employing 6% (based on total weight of monomers) octyl phenol modified with an average of 40 ethylene oxide units as the emulsifier and a conventional emulsion polymerization technique:

| | Percent |
|---|---|
| Ethyl acrylate | 41 |
| Methyl methacrylate | 50 |
| Methacrylic acid | 7 |
| Dimethylaminoethyl methacrylate | 2 |

The final solids concentration of the emulsion was 40.0%. The emulsion was diluted with water to 15% polymer solids.

We claim:
1. In an aqueous composition adapted to be used for polishing flooring, furniture, and the like, said composition being capable of forming a coating film having a Knoop hardness number of at least 0.5, and containing
   (a) 10 to 100 parts by weight of a water-insoluble addition polymer obtained by the emulsion polymerization of at least one monoethylenically unsaturated monomer,
   (b) 0 to 50 parts by weight of an alkali-soluble resin, with the proviso that said alkali-soluble resin does not exceed 50% by weight, based on the weight of (a),
   (c) 0 to 90 parts by weight of a wax,
   (d) wetting, emulsifying and dispersing agents in an amount of 0.5 to 20% by weight of the sum of (a), (b) and (c),
   (e) at least one polyvalent metal complex in an amount of about 1 to 50% by weight of (a),
the improvement wherein said polyvalent metal complex is a polyvalent metal chelate of a bidentate amino acid ligand or a polyvalent metal ammonium chelate of a bidentate amino acid ligand.

2. A composition according to claim 1 wherein (b) is selected from the group consisting of shellac, Manila gum, loba gum, alkali-soluble alkyds or polyesters, and copolymers of styrene or vinyltoluene with at least one $\alpha,\beta$-monoethylenically unsaturated acid or anhydride.

3. A composition according to claim 1 having a pH of about 7 to 11.

4. A composition according to claim 1 wherein (a) is prepared by emulsion polymerization of monoethylenically unsaturated monomers comprising about 1 to 18% by weight of an $\alpha,\beta$-monoethylenically unsaturated acid.

5. A composition according to claim 4 wherein the alkali-soluble resin of (b) is a polyester or alkyd modified by either rosin or a fatty acid having 8 to 18 carbon atoms.

6. A composition according to claim 1 wherein the polyvalent metal cation of said polyvalent metal complex is zinc.

7. A composition according to claim 1 wherein said ligand is selected from the group consisting of glycine, alanine, $\beta$-alanine, valine, leucine, proline and phenylalanine.

8. A composition according to claim 1 wherein said polyvalent metal complex is zinc glycinate.

9. A composition according to claim 1 wherein the sum of components (b) and (c) total at least 5 parts.

10. A composition according to claim 1 in which the relative weight proportions between the polymer, wax, and alkali-soluble resin are 10 to 95 parts of the polymer, 2 to 90 parts of wax and 1 to 40 parts of resin.

References Cited
UNITED STATES PATENTS

| | | | |
|---|---|---|---|
| 3,308,078 | 3/1967 | Rogers et al. | 260—27 |
| 3,320,196 | 5/1967 | Rogers | 260—27 |
| 3,328,325 | 6/1967 | Zdanowski | 260—22 |

HOSEA E. TAYLOR, Jr., Primary Examiner

R. W. GRIFFIN, Assistant Examiner

U.S. Cl. X.R.

106—6, 8, 10, 11; 117—161, 167, 168; 260—26, 27, 28.5, 29.2, 29.6, 32.4, 41, 873, 886